United States Patent [19]

Chandra et al.

[11] Patent Number: 4,916,738
[45] Date of Patent: Apr. 10, 1990

[54] REMOTE ACCESS TERMINAL SECURITY

[75] Inventors: Akhileshwari N. Chandra, Mahopac; Liam D. Comerford, Carmel; Steve R. White, New York, all of N.Y.

[73] Assignee: International Business Machines Corp., Armonk, N.Y.

[21] Appl. No.: 927,306

[22] Filed: Nov. 5, 1986

[51] Int. Cl.⁴ .............................................. H04K 1/00
[52] U.S. Cl. ........................................ 380/25; 380/21; 380/5.1
[58] Field of Search ................................. 380/21–25, 380/43, 44, 3–4, 49, 50; 364/200, 900

[56] References Cited

U.S. PATENT DOCUMENTS

| | | | |
|---|---|---|---|
| 3,798,359 | 3/1974 | Feistel | 178/22 |
| 3,798,605 | 3/1974 | Feistel | 380/25 |
| 3,958,081 | 5/1976 | Ehrsam et al. | 178/22 |
| 4,193,131 | 3/1980 | Lennon et al. | 380/25 |
| 4,223,403 | 9/1980 | Konheim et al. | 380/24 |
| 4,227,253 | 10/1980 | Ehrsam et al. | 380/25 X |
| 4,238,853 | 12/1980 | Ehrsam et al. | 380/45 |
| 4,238,854 | 12/1980 | Ehrsam et al. | 380/4 |
| 4,262,329 | 4/1981 | Bright et al. | 380/25 X |
| 4,264,782 | 4/1981 | Konheim | 380/25 |
| 4,268,715 | 5/1981 | Atalla | 380/25 |
| 4,281,216 | 7/1981 | Hogg et al. | 380/23 |
| 4,323,921 | 4/1982 | Guillou | 380/23 X |
| 4,326,098 | 4/1982 | Bouricius et al. | 380/25 |
| 4,423,287 | 12/1983 | Zeidler | 380/24 |
| 4,430,728 | 2/1984 | Beitel et al. | 364/900 |
| 4,471,216 | 9/1984 | Herve | 235/380 |
| 4,503,287 | 3/1985 | Morris et al. | 178/22.08 |
| 4,621,321 | 11/1986 | Boebert et al. | 364/200 |
| 4,633,037 | 12/1986 | Serpell | 178/22.14 |
| 4,638,120 | 1/1987 | Herve | 178/22.08 |
| 4,652,990 | 3/1987 | Pailen et al. | 364/200 |
| 4,665,396 | 5/1987 | Dieleman | 380/23 |
| 4,677,670 | 6/1987 | Henderson, Jr. | 380/23 |
| 4,683,968 | 8/1987 | Appelbaum et al. | 380/4 |
| 4,691,355 | 9/1987 | Wirstrom et al. | 380/23 |
| 4,694,492 | 9/1987 | Wirstrom et al. | 380/23 |
| 4,720,859 | 1/1988 | Aaro et al. | 380/23 |
| 4,731,840 | 3/1988 | Mniszewski et al. | 380/21 |
| 4,779,224 | 10/1988 | Moseley et al. | 364/900 |

FOREIGN PATENT DOCUMENTS 2124808  2/1984  United Kingdom.

OTHER PUBLICATIONS

Simmons, "How to (Selectively) Broadcast a Secret", IEEE, 1985.

Primary Examiner—Stephen C. Buczinski
Assistant Examiner—Bernarr Earl Gregory
Attorney, Agent, or Firm—Pollock, Vande Sande & Priddy

[57] ABSTRACT

The invention provides a method of securing remote terminal access to a central computer. The method uses the services of a physically secure coprocessor which is, or will be, coupled to the remote terminal for the purposes of effecting remote access to the central computer. The method comprises transferring an encrypted decryption key from the central computer to the physically secure coprocessor. The coupling between the coprocessor and remote terminal allows a file to be encrypted which can confirm that the remote terminal (which is the source of the encrypted file) has or had access to the specific coprocessor to which the encrypted decryption key had previously been transferred. Thereafter the encrypted file is transferred to the central computer and is examined there to confirm that the source of the file has access to the specific coprocessor which received the encrypted decryption key. Access is allowed, by the remote terminal, to the central computer after confirmation is produced by the examination at the central computer.

14 Claims, 5 Drawing Sheets

ENCRYPTED DECRYPTION KEY $E_{CSK}(AK)$

PLAIN TEXT SOFTWARE

ENCRYPTED SOFTWARE $E_{AK}$(SOFTWARE)

ENCRYPTED TOKEN DATA $E_{AK}$(TOKEN DATA)

REMOTE ACCESS TERMINAL SECURITY

DESCRIPTION

1. Technical Field

The invention relates to a security mechanism for remote terminal access to a host computer.

2. Cross-Reference to Copending Applications

Reference is made to copending applications Ser. Nos. 651,184, filed Sept. 14, 1984; Ser. No. 927,629, filed Nov. 5, 1986 now U.S. Pat. No. 4,817,140; Ser. No. 927,629, filed Nov. 5, 1986; Ser. No. 927,297, filed Nov. 5, 1986; Ser. No. 927,299, filed Nov. 5, 1986; Ser. No. 927,298, filed Nov. 5, 1986 now U.S. Pat. No. 4,860,351; and Ser. No. 927,286, filed Nov. 5, 1986 all assigned to the assignee of this application.

3. Background Art

The desire to share computer resources has led to the use of remote terminals which are connected to a computing system via a communication medium. It was readily recognized that these remote terminals are an avenue of attack on the security of the computing systems. However, such remote terminals are of sufficient value that access from remote sites remains a common feature of most large computing complexes. There are two general approaches by which unauthorized access is gained to a computing complex through a remote terminal. In one case, the user ID and password of a valid user are stolen or guessed or found by search. The second technique is to "steal" a valid user session which is in progress by switching the connection of the user to the thief's terminal.

Most efforts at protecting computing systems from such attack have centered on the first form of attack in that this is far and away the most common of the two. The form of protection which is almost universally used is multiple confirmation of the identity of the user. For example, in telephone callback systems, the identity of the user is confirmed by his possession of unique knowledge and his presence at a unique location. The unique location is verified by a call back technique using a call back telephone number registered for that user in the central computing complex.

There are very few criteria which can be used to identify a user. These are a unique piece of knowledge, a unique possession or a unique physical characteristic; the identification of a person by his presence at a unique location is inadequate to the task of personal identification. Given the availability of such technologies as telephone call forwarding or telephone line tapping, it is very difficult to establish the location of a remote person, much less his identity from his location.

The telephone callback systems attempt to determine the location of a person at a remote point by calling him back on the telephone after receiving his telephone request for access. This determination is made through a medium over which the computing center has no control; the telephone lines. These lines can be tapped or redirected with call forwarding. The unique location identification is thus easily forged. It is further flawed in that some flexibility must be provided in these systems to individuals who are travelling, and this flexibility is another avenue of attack.

Thus, in the main, the strength of these terminal security systems rests largely on the possession of unique information by the authorized user. Typically that information is accessed by the computing system for identity verification only at the beginning of a session.

In a slightly different vein, Beitel et al in U.S. Pat. No. 4,430,728 employs a physical security key which is coupled into a connector provided for it at the remote terminal. The security key has electronically stored therein two pieces of information which are required for access to the central computer. Thus the security in that system depends on the difficulty for unauthorized individuals to obtain or copy an appropriate security key. Nevertheless, once the security key has been used (identity is verified at the beginning of the session), it does not appear to be referred to again. Thus, there remains the possibility that the session can be "stolen".

Ehrsam et al in U.S. Pat. No. 4,238,853 propose employing, in a remote terminal, a Data Security Device (DSD) which includes a key memory device and a cryptographic device. The DSD is both physically and logically secure, so that even the user does not have access to the keys which may be stored therein. One problem with the Ehrsam approach is the necessity to transport a terminal master key to the terminal in clear or plain text form. Ehrsam suggests that this transfer can be accomplished "by transporting the key by courier, registered mail, public telephone, etc. The likelihood of an opponent obtaining the key during transit can be lessened by transporting different portions of the key over independent paths and then combining them at the destination." Nevertheless the danger inherent in transporting a key in plain text form should be apparent.

Bell, in GR No. 2124808 describes an electronic lock and key having some similarities to the token described below. However, the Bell key is, in general more complicated (some embodiments require a crypto engine in the key), requires each key to be initialized with each terminal (or lock) for which the key must provide access, requires an unnecessarily long initialization and authorization protocol (at least two rounds of query-response) and does not suggest the use once feature of the token which is described below.

It is one object of the present invention to obviate this difficultly, i.e. requiring transportation of a cryptographic key "in the clear" or in plain text form. It is another object of the present invention to achieve the foregoing object without complicating the security mechanism and/or compromising it. Thus, it is a general object of the invention to provide a remote terminal security system which is substantially more secure than the commonly existing systems or even the systems described in the patents referred to above. The system of the invention relies both on unique knowledge and unique possession to verify the identity of a user. It is highly resistant to attempts to forge the possessor's "signature" from a remote location. It offers a continuous reverification capability to fight session theft.

SUMMARY OF THE INVENTION

As will be described below, one element of the invention is the use of a privileged coprocessor (PCP) which is described in applicants' copending application Ser. No. 651,184, now U.S. Pat. No. 4,644,493, filed Sept. 14, 1984 (referred to there as Support Hardware); a different version of the PCP is described in applicants' copending application Ser. No. 927,629, filed Nov. 5, 1986, and referred to as a coprocessor. The disclosures of both applications are incorporated herein by this reference.

In accordance with both descriptions, the PCP is a hardware option which may be added to a personal computer, or single operator system. The PCP provides a completely concurrent higher level of privilege processing environment. The PCP provides a cryptosecure system for the transmission of decryption keys and programs into the higher privilege computing environment. The PCP has the capability of storing information and executing instructions in a processor in a region of memory which is both physically and logically secure from access by a user, and it is this capability which is the basis of its application in remote terminal security. The fundamental requirement is that the remote terminals which are to be granted access to a computing complex are equipped with PCPs or have access thereto.

The security mechanism of the invention provides for authorizing a remote terminal and allowing access by authorized remote terminals to secure computing complexes.

Classical cryptographically secure systems require that two parties to a secure message transfer share some piece of common knowledge referred to as a key. The key is used by a message sender to encipher the message to make it unintelligible to those who do not possess the key. The same key (or a correctly corresponding key in some cryptographic systems) must be used by the message receiver to render the message intelligible.

In accordance with the invention, in connection with the access authorization procedure, a message sender is the security office or security function of the computing center and the message receiver is the physically and logically secure PCP at the remote terminal. The computing center security office originates a decryption key which, in secure or encrypted form, is provided to the physically secure PCP. In accordance with one embodiment, that transfer can be implemented via a floppy disk as described in the copending application Ser. No. 651,184. Alternatively and preferably, the transfer is implemented as described in Ser. No. 927,629 with a token and any other software distribution medium, such as a floppy disk. The token is a device described in application Ser. No. 927,629 and Ser. No. 927,297 (the disclosure of which is incorporated herein by this reference) and as described there, for all practical purposes, cannot be copied. The token has the characteristic that it is permanently and irreversibly changed by the act of reading its data contents. The properties of such a token device make it possible to personalize the PCP so that the software stored on the floppy is usable only at the PCP which reads the token data. If the PCP is installed in such a terminal then the PCP reads the token with a forgery resistant query/response protocol also described in Ser. No. 927,629.

It should be noted that the transaction which transfers a decryption key from the computing center, while at its core identical to the ARE transaction of the copending applications, is enlarged to support objectives which are not needed in the commercial transfer of a software product. These include identification of the particular user receiving the key and software, recording the correspondence between the user and the key, and verifying that the installation has been performed on the appropriate PCP.

Thus the first step in the authorization protocol is initiated by obtaining an authorization disk and token. This authorization disk is obtained by the user by that user appearing in person at the computing center and supplying such identification as is required by that center. It is conceivable that some computing centers may distribute such disks by other means which do not allow person to person identification. Computer access accounts given the bank customers is an example of such a case. It is within the scope of this invention that the capacity to identify users remotely can be used to limit their access privileges and protect the data transferred within the context of that access. The authorized user then performs a procedure on his PCP-equipped terminal to transfer the cryptographic application key (AK) into the memory of the PCP. This key is in encrypted form on the disk. The PCP can (as will be described) decipher this key before storing it for later use. Typically, the application key (AK) will be unique to the PCP, i.e. AK will not be used for any other PCP. The authorization protocol continues by transferring an encrypted file from the PCP, to which the encrypted decryption key has been transferred, to the computing complex. For example during the initialization process the PCP writes an encrypted file onto the authorization disk (or another disk) in the course of transfer of the key. This file contains a "digital signature" of the PCP. Such a signature in one embodiment consists of an encrypted copy of a PCP- specific serial number. Upon return of this file or message to the computer center, it can thus be established that the authorization disk was installed on the intended or "correct" personal computer or terminal. Until the authorization disk has been returned to the computing center and until it has been examined for this message, no remote access is granted to the user. In another embodiment, a digital signature from the PCP is written to the token which then may be returned to the computing complex for verification.

It may be advisable to place a time limit on the period elapsed between the issuance of the authorization disk and the return of the message or file to further reduce the extremely small possibility that the authorization could be forged and used to "authorize" any other remote terminals.

The net effect of the authorization procedure is to install at least one secure decryption key (without exposing the key to the user) in the PCP associated with the user's terminal. At the same time, a means has been provided to the computer center (through the message or file returned to the computing center) to verify that the key has been installed on the intended personal computer or terminal. It should be apparent that the use of a token and floppy disk as described in the copending application is but one manner of implementing the invention. As described in the application Ser. No. 927,629 , by expanding the memory capacity of the token, the necessity of using a disk to install the decryption key in the PCP can be eliminated so that only the use of a token is required.

Accordingly, in one aspect the invention provides a method of remote terminal authorization comprising the steps of:

a. transferring an encrypted decryption key to a physically secure coprocessor [PCP], b. coupling said physically secure coprocessor to said remote terminal, c. transferring an encrypted file from said coprocessor to a central computing complex to allow the central computing complex to identify the coprocessor which generated the encrypted file, and d. examining said encrypted file at said central computing complex to verify that a specific coprocessor has created said encrypted file before authorizing access by said remote terminal coupled to the specific coprocessor.

Once the authorization steps have been completed, the user may attempt to access the computer complex. Initially, communication between the remote terminal and the computer complex may be carried out in the clear and contain only the user identification (or user ID, but not the user password or PIN). Alternatively, this initial communication can be enciphered by the PCP using a special start up key which is common to several if not all users of the computer center. Clear text or a special start up key is used for this communication as the computer complex must know the user ID to select the user-specific encryption key (AK) for subsequent communication. Clearly, the start up key, if used, may also be supplied in encrypted form on the authorization disk and installed in the PCP as described earlier, or in the alternative can be installed in the PCP at the time it is manufactured.

All subsequent communication between the user and the computer complex, including that containing the user's password or PIN, may be in cipher text using the user-specific key (sometimes referred to as AK) installed in the PCP during the authorization procedure. The terminal emulation program running in the user's terminal hardware (or personal computer) does not have access to this key and hence cannot encipher/decipher the transmission itself. It must ask the PCP to perform these functions. The key itself is never exposed to the user.

The computer complex, in its transmissions, can also include an enciphered command to the PCP to alter its decryption key for subsequent transmissions. Thus the computer center has the facility to alter the decryption key at will without impacting the user in any way, in fact the user may not even be aware of it.

Accordingly, at the option of the computer complex, and during access by a remote terminal, the invention contemplates that at least some messages exchanged include a replacement key for the PCP to be substituted for the decryption key or an earlier replacement key, or to be used only for the duration of that particular connection without being a replacement for any previously installed keys.

In connection with the authorization procedure, and in lieu of employing a token floppy disk pair, the encrypted decryption key can be installed in the PCP while the PCP is physically co-located with the computer center. In this variation the PCP is given to the user upon proper authorization and validation of the user's identity. Alternatively, the user may present his PCP to the computing center. In these implementations the authorization disk is not needed, nor is it necessary for the user to bring back a diskette with the results of the execution of a program for installation validation purposes. The validation of installation is implicitly supplied by the computer center by its execution of the initialization.

Ensuring that every message transmitted between the computer complex and the remote terminal is enciphered does provide security but generates overhead in that the procedure requires resources to be expended for enciphering and deciphering. This overhead can be reduced by using a periodic terminal verification protocol. In this approach most of the communication between the user's terminal the computer complex (subsequent to verification of user authorization) is in clear text. However, at intervals determined by the computer complex, and certainly before granting the user access to it, the computer complex requests the user's personal computer or terminal to perform certain predetermined transformations on a data stream provided by the computer complex. These transformations have the following characteristics:

a. the result of the transformation is a unique function of the input data stream and the decryption key, b. by examining the results one can be sure that the decryption key was available to the processor performing the transformation, c. by examining the result and the input data stream the decryption key itself cannot be determined.

Some examples of a suitable transformation meeting these criteria are:

1. encipher the input data stream using the decryption key, or 2. decipher the input data stream using the decryption key, or 3. encipher or decipher using the decryption key, the results of another operation performed on the input data stream, or 4. generate a stream of pseudo-random numbers using the decryption key and an input data stream.

When the terminal receives the request of the computer complex, it in turn requests the PCP to perform the requested transformation and transmits the results to the computer complex. The computer complex performs the same transformation as the PCP (as the computing center has access to the key AK) and compares the results of its computation with that provided by the terminal. If the results of both computations are the same then the PCP has a valid decryption key and remote terminal access if granted or continued. Otherwise remote terminal access is terminated.

While the foregoing discussion has assumed that the decryption key used at the PCP and that employed at the computing center are identical, that is not essential to the invention. Rather, several sets of keys may be transmitted by the computer complex in cipher text to be stored in the PCP. One of these keys can be used by the PCP to encipher the transmission to the computer complex whereas the other set is used to decipher communications from the computer complex. The keys may also be used in the PCP for other secure operations.

It should be apparent that access to the computer complex may require, in addition to the PCP storing an authorized decryption key, an appropriate user password or PIN. This additional identifier may also be used in the PCP so as to prevent misuse should the PCP itself be stolen. The PCP could be caused to enable cryptographic functions under the user identifying key if and only if the user can correctly identify himself to the PCP.

BRIEF DESCRIPTION OF THE DRAWINGS

The present invention will now be described in the further portions of this application, when taken in conjunction with the attached drawings, in which like reference characters identify identical apparatus so as to enable those skilled in the art to practice the invention. In the attached drawings.

DETAILED DESCRIPTION OF THE PREFERRED EMBODIMENTS

For some applications, terminal authorization may require only the installation of a decryption key (or application key). In general, however, a terminal must also be capable of running protected (encrypted) software to communicate with the computer complex. This software is (preferably) protected and executed as described in Ser. No. 927,629.

Figure 1:
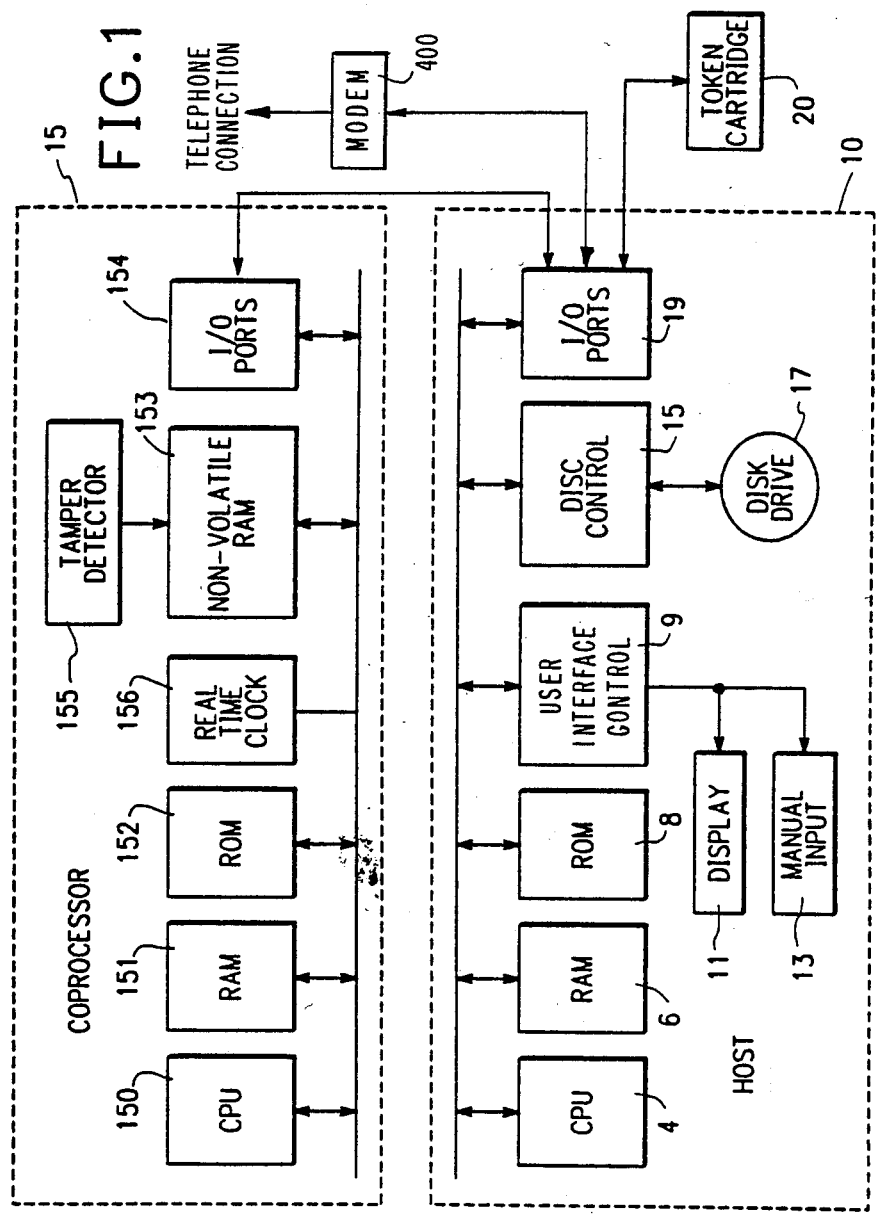
FIG. 1 schematically illustrates the remote terminal including the PCP or coprocessor; in the example of FIG. 1 the remote terminal includes a host or PC.
Figure 2:
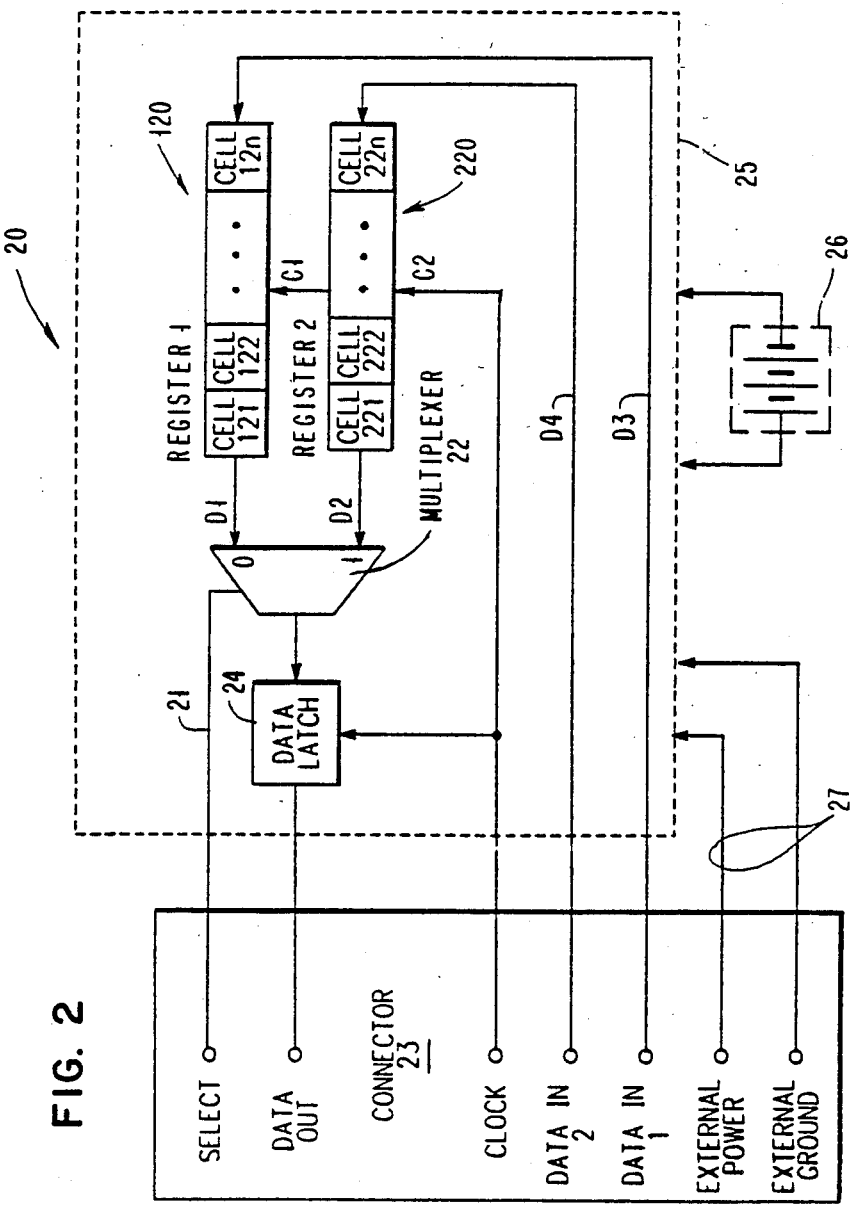
FIG. 2 shows a hardware cartridge which can be safely used to store plain text token data.

Before describing the particular steps in accordance with the invention, reference is made to FIGS. 1 and 2 to describe the architecture of a typical terminal and a typical token; in the main this description is similar to that contained in Ser. No. 927,629 to which reference is made for further details. The term "coprocessor" is used in the following interchangeably with the designation PCP. The coprocessor is itself a computing system. It has it own processor, firmware and read only memory (ROM), a real time clock and RAM. It could be installed in a personal computer or terminal as an adapter card set mapped into the memory and I/O address space, or it could merely be coupled to a personal computer or terminal via an I/O port. (Hereafter, the terms personal computer or PC and terminal will be used interchangeably to refer to a user device.) It should be noted that it is a feature of the present invention, as contrasted with the invention described in the above referenced application Ser. No. 651,184, that the coprocessor could be portable. The coprocessor communicates with the PC in one of two different fashions. If the coprocessor is directly installed (such as a card set) in a PC, then it can communicate with the PC through a region of common memory and through a set of registers which reside in the port address space of the PC. In this version the common memory is part of the coprocessor. The coprocessor controls its bus transceivers and can cause the common memory to be unavailable to the PC for read operations. (This architecture is described in our co-pending application Ser. No. 651,184, filed Sept. 14, 1984.) In the alternative, the coprocessor can communicate with the PC through an I/O port. Regardless of the manner in which such communication is effected, it is necessary that only a portion of the coprocessor memory be addressable by the PC. It is also necessary that the portion of the coprocessor memory which is not addressable by the PC be physically inaccessible to the user. It is in this memory in which the coprocessor will decrypt and run the encrypted portion of the application software.

In addition to the processor, memory (RAM and ROM) and port address registers (if any) the coprocessor has physically and logically secure memory space which contains ROM and non-volatile memory devices (such as battery backed CMOS RAM or EEPROMs).

The ROM contains the system firmware. It is in the form of a monitor whose commands are the services which the PC may request from the coprocessor. A complete set of such services would include as a minimum set:

1. Acquire a Right-to-Execute (ARE).
2. Load, decrypt, and run application (LDR).

The non-volatile RAM device is used by the coprocessor as a secure non-volatile memory in which decryption keys AK1, AK2, etc. of initialized applications are stored along with the set of common supervisor keys (CSKs) supplied with a PCP by its manufacturer.

It should be understood that the coprocessor must have at least two levels of privilege so that the memory used to store AKs can be properly secured from the user. This is needed because the user could be a writer-of-software as is for example the security group of the computing center. If the software executed on behalf of one author could read the AKs of other authors, the user-authors could recover other authors' AKs and decrypt their protected software. Management of installation, use of, and access to AKs should be understood to be important functions of the higher level of privilege to the system.

All application software decrypted and run on the coprocessor is at a lower level of privilege than the ROM resident firmware which controls non-volatile RAM access and, loading, decrypting, and starting of protected software.

As noted earlier, the coprocessor must be physically as well as logically secure. This security is required in order to prevent the user from applying logic analyzers or other digital control and recording devices to gain a record of the content of the secure memory space and hence the AKs or decrypted software. A suitable packaging for the coprocessor is described in applicants co-pending application Ser. No. 927,309, filed Nov. 5, 1986, the disclosure of which is incorporated by this reference.

The PC or individual work station is a common single bus micro-processor system. The IBM PC is typical of this class of machines. Such system uses the bus (which can be an array of transmission lines with sockets at intervals) as a communication medium between logically separate sub-systems. Some of the sub-systems may reside on the same packaging element (in this case a printed circuit board called the "System Board") that support the bus. Sub-systems which are necessary to the function of the system or offer expansion of the function of the system are handled by attachments to the bus through the sockets. It should be noted that the components which constitute a sub-system may be made so that parts of the sub-system may reside on different packaging elements.

The complement of sub-systems which are shown in FIG. 1 in the region labeled host, as indicated at 10, is an example of a common PC. The PC CPU 4 is a single chip micro-processor and a group of support chips. The PC CPU 4 is supplied with a periodic signal called the clock and with connection to the bus by the support chips. The micro-processor is commonly supplied with more support than this, but all support is aimed at executing a repeating cycle of fetches of instructions from memory, fetches of data from some selected element of the sub-systems (such as Random Access Memory), execution of instructions, and when needed, storage of resulting data in an selected element of the system. The CPU 4 may have support supplied to it called direct memory access (DMA) which allows the micro-processor to be relieved of tasks which involve the movement of data from one addressable element to another.

The micro-processor controls the type of bus operation performed (fetch, store, etc.) and the type of element selected (RAM, Port Address Register, etc.) by which of the controls lines in the bus is "asserted" (changed to the appropriate potential according to a protocol called the bus definition). By these means, the micro-processor is able to obtain a collection of instruction (called the program), execute the instruction on a set of data, and cause the data stored in other elements of the system to change as a consequence of the execution of the instructions.

The RAM 6 is a sub-system from which data can be fetched from and written to by the CPU 4. It is the sub-system used to store data and instruction which are loaded from some other source. If it has meaningful content, then that content has been written to it by the CPU 4. At the time that the computer is powered on, the RAM 6 contents are, for practical purposes, meaningless.

The ROM 8 is a sub-system from which data can only be fetched. It may contain a collection of programs which are needed to start useful operation of the computer and which are useful for controlling the remaining sub-systems.

The remaining sub-systems, terminal control unit 9, display 11, manual input device 13, disk system control unit 15, disk drive 17 and I/O port 19 can be characterized as having or supporting both addressable elements and mechanical, optical or electro-magnetic (or other) elements which can affect human senses, be affected by human actions, or manipulate a magnetic medium to perform read and write operations involving creating and sensing the boundary between magnetic domains on the magnetic medium. The contents of some of the addressable elements control the actions of the mechanical, optical, and electro-magnetic effectors of the sub-system, and the contents of other addressable elements are controlled by the mechanical, optical or electro-magnetic elements. Thus, by these means, it is possible for the computer system to interact with the user and with magnetic and other media. The sub-system which provides the elements needed to interact with the user is called the user interface control sub-system. The common form of sub-system which allow read and write operations on magnetic medium are called disk control systems. Given these elements it is possible to describe in broad outline, the operation of such systems.

At the time of power up, the micro-processor executes an instruction fetch from a fixed location in memory. This address is one which is occupied by the ROM 8. The instruction in that location is a jump to the programs which have the effects of testing and initializing the system for use. One of the system initialization programs causes a program called the Disk Operating System (DOS) to be read from a disk and executed. This program (the DOS) is able to accept commands from the user through the use of the terminal control system. These commands include causing a program chosen by the user to execute on the system by naming the file (using the manual input) in which the program resides to the DOS program.

The complement of sub-systems which are shown in FIG. 1, as indicated at 15 is an example of a minimal coprocessor system. The elements of the hardware may be thought of as consisting of two parts. One part (at 154) contains addressable elements which allow the hardware to communicate with the PC so that commands and data may be exchanged (much as between a user and the host system). The other parts contain the coprocessor CPU 150, RAM 151, ROM 152 real time clock 156 and non-volatile RAM 153, not concerned directly with communicating with the PC.

The non-volatile RAM 153 may be implemented as EEPROM or as battery backed CMOS RAM or in any other technology which allows erasure of that memory's contents.

The combination of properties, non-volatility and eraseability are needed so that the software keys (AK's) and coprocessor supervisor keys (CSK) can be retained between uses of the coprocessor, but can be erased in the event that physical intrusion detection system 155 detects a tampering attempt; see copending application Ser. No. 927,309 for an example of such a system.

A real time clock 156 is a sub-system which contains a specialized counter. It is supplied with power by a battery, typically the same battery as is used to power the nonvolatile memory and the tamper detector. The battery supplies power to the counter and its support chips during the period when the computing system is turned off. The counter increments its registers in response to clock signals generated by its support chips so that its registers reflect the interval of time since the registers were initialized by the coprocessor manufacturer. Thus, if the registers were initialized to the time of day, then their contents would approximately track the time of day. The registers of the real time clock can be read by the CPU 150.

FIG. 1 shows a configuration of the PC and associated coprocessor by which protected software can be executed. For purposes of this description we will assume that the software is distributed on magnetic media such as a floppy disk, although as the description proceeds it will become apparent that the software may be distributed by any conventional technique. While in accordance with the invention described in the referenced application Ser. No. 651,184 the Support Hardware communicated with the host through its internal bus; it is a feature of the present invention that the coprocessor can be coupled to the PC through a communication port, so that the coprocessor can be conveniently portable. We will describe operation of the system using this configuration although it should be apparent that the present invention can also be employed when the coprocessor communicates to the PC through an internal bus.

The coprocessor 15 has some features in common with the Support Hardware of our referenced application Ser. No. 651,184. More particularly, the coprocessor provides each software vendor with an instance of a higher privilege level than the user but at the same time does not give any software vendor access to other vendors' privileged information. All application software decrypted and run on the coprocessor is at the lower of the two privilege levels; the higher privilege level, implemented in the ROM resident firmware, controls access to the non-volatile RAM 153, loading, decrypting and running operations. This structure in the coprocessor prevents a software vendor from writing a monitor which would run on the coprocessor to access the firmware and non-volatile memory (including the decryption keys) and make that information available to the host 10.

Accordingly, the coprocessor 15 has a first or lower privilege level which has access to the RAM 151; as already described, the RAM 151 is secured from the user and/or the host 10. The first privilege level includes first level operating instructions for executing protected software. The coprocessor 15, however, also has defined a second privilege level including a second level secure memory and second level operating instructions. The second level secure memory is represented by the non-volatile RAM 153 and the second level operating instructions are defined in the ROM 152. The second privilege level is secured both against the user and any software author. It is the second privilege level of the coprocessor 15 which is involved in acquisition of rights to execute and therefore controls the procedures antecedent thereto. The same second privilege level also responds to user requests for execution of protected software, provides for the loading and decryption of protected software and initiating the first privilege level into operation for execution of the protected software, but only in the event that the second privilege level determines that such execution is authorized.

There are, in accordance with the present invention, two modes of operating on or with protected software, a first mode called Acquire Right-to-Execute (ARE) is required to authorize the coprocessor to execute the protected application. Each coprocessor may be authorized to execute many software applications by performing the ARE transaction for each application. Thereafter, when the apparatus executes a software package for which it is authorized, it operates in a Load, Decrypt and Run (LDR) mode.

Figures 3, 5:
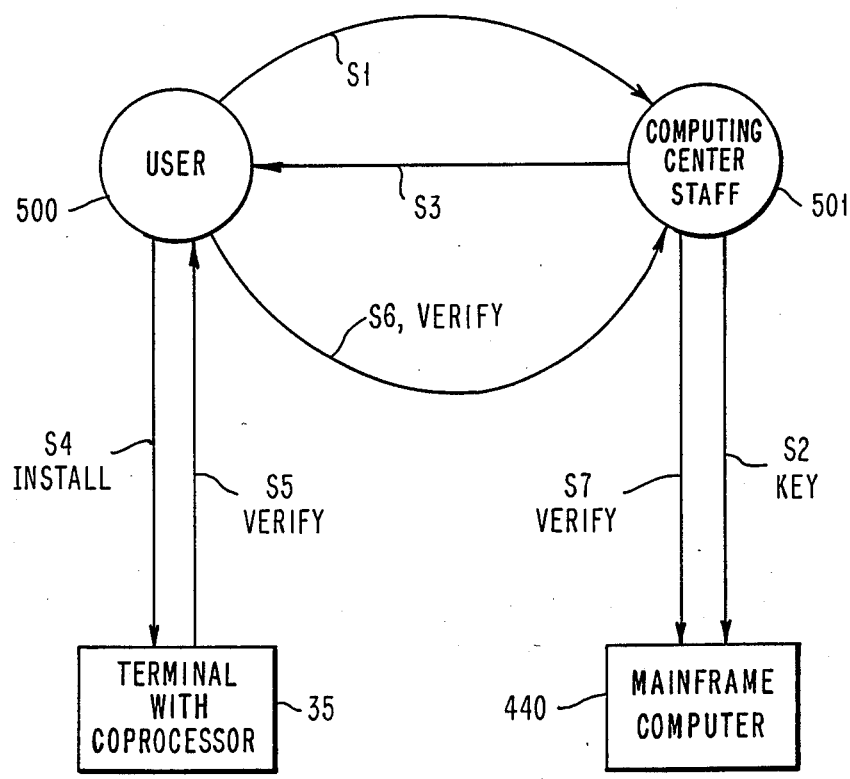
FIG. 3 is an example of the contents of the disk component of a token disk pair.
FIG. 5 illustrates one embodiment of the procedure for remote terminal authorization in accordance with the invention.

FIG. 3 describes a software configuration which is employed in accordance with the present invention. As shown in FIG. 3 the several files may be distributed as unit (either on a magnetic medium or via a communication link). A first file is an encrypted software decryption key EAK. The second file is the software which includes both plain text software and protected or encrypted software (EAK (Software)). The last file is encrypted token data EAK(TOKEN DATA). While the encrypted software and encrypted token data are encrypted using a common key (AK), such that each of them can be decrypted using the decryption key (AK), the software decryption key is encrypted with a different key (CSK); the hardware vendor's key which, as will be described, can be maintained secret from the software vendor. While in accordance with the invention described in the previous application Ser. No. 651,184, a key pair using a "public key" cryptographic system must be used to encrypt and decrypt the software key, it is a feature of this system that any adequately secure cryptographic system may be used including DES or other "symmetric" key systems in which the same key is used for encryption and decryption.

For purposes of this description we will assume that the files of FIG. 3 are contained in floppy disk which is loaded in the disk drive 17. In order to initialize the coprocessor, a token cartridge 20 is coupled to the coprocessor 15 or to the host PC 10. The cartridge 20 includes token data stored in a memory device which has unique characteristics as will be described below. At this point it suffices to note that the cartridge 20 is arranged so that it can be used on a single occasion; the act of employing the cartridge 20 alters it such that it is no longer usable for its intended purpose.

In order to employ the (protected) software the coprocessor 15 must be provided with the decryption key (AK) which is needed to render the encrypted portion of the application executable. This key will be transferred to the coprocessor 15 in such a way that the transfer mechanism cannot be reused or reproduced. This is accomplished by requiring the presence of an unused token cartridge to effectively transfer the decryption key into the nonvolatile memory of the coprocessor 15. "Unused" in this context means only that the content of the token cartridge supplied by the computer center (software author in the software copy protection case) has not been read by any means prior to this occasion. As noted the token is difficult to forge for reasons which are discussed later and is effectively erased in the transfer transaction. The token has information content which is identifiable to the coprocessor 15 either because it is enumerated in an encrypted file associated with the program (or alternatively provided by another source, as described below). The enumeration evidences the fact that this has been provided by the computing center. It is authenticated to the coprocessor 15 by the fact that the information is encrypted with the same key (AK) which has been used to encrypt the protected portion of the application.

The cartridge 20, storing the transfer token is coupled to the I/O device 154 of the coprocessor (not illustrated) or the I/O device 19 of the PC (as illustrated) via a connector provided for that purpose. Since the connector to the cartridge 20 is exposed, and can therefore be monitored by the user, the transaction which uses the connector must be difficult to forge given that some of the data will be exposed. To have this property, each transaction should be effectively unique and verifiable by the coprocessor.

The cartridge 20 is both physically and logically secure. Physical security may be provided in a number of fashions, one of those fashions is described in the applicants co-pending application Ser. No. 927,309, filed Nov. 5, 1986. A preferable method of physical security is to implement the circuitry of the token as a single integrated circuit chip. The cartridge 20 includes memory which behaves in such a fashion which allows verification of no-prior-use as well as verification of its authenticity. Both verifications are needed by the coprocessor before the decryption key AK will be accepted for future use. As will be described below the cartridge 20 may be manufactured by a third party source so long as its connector and protocol are standardized. Its information content must be determined and loaded by the software author or the author's representative. Data is transferred from the cartridge to the coprocessor using a query/response protocol. The query is a random number, and it in combination with the token data determines the token response. The accessible information passing on the unsecured path between coprocessor 15 and cartridge 20 is the "random number" and the response of the cartridge, neither of which reveals the token data. The coprocessor has access to a copy of the token data (for example by decrypting the encrypted token data from the software distribution media). Thus the coprocessor can independently determine the "correct" response, and can compare the actual response from the cartridge 20 with its own, independently determined "correct" response. Thus only the random query and the actual response are exposed during the transaction. The complete token information needed to combine with the query to obtain the response is not revealed. At the same time as the cartridge 20 produces its response, it also alters its contents so the cartridge cannot be reused. This is accomplished by providing a region of memory in cartridge 20 which does not behave as if it were a normal memory under read operation. (A block diagram with suitable architecture for the cartridge 20 is shown in FIG. 2). Briefly, the cartridge 20 includes at least two memory segments, both of which can be written to as if they were conventional serial input shift registers. When a read is performed, however, the access properties of the regions changes. During reads both memory segments are enabled and produce data at an output as would a normal serial output shift register. Both the outputs are sent to a multiplexer. The multiplexer selects which of the two (or more) segment's data to route to the connector (and thus to the coprocessor) by the state of a control line which is contained within the connector, and which is driven by the coprocessor with the "random number". When the memory region of the cartridge is read out, the contents in both segments are erased. This ensures that a pirate observing the transaction between the coprocessor and the token cartridge can only obtain a portion of the information content of the cartridge. This portion of the token information is sufficient to verify to the coprocessor that it is a valid token which can authorize the coprocessor to use the software package but it is far from sufficient to allow a pirate to reconstruct its original content in order to fool other coprocessor into accepting a key which is not rightfully owned.

In an embodiment of the cartridge 20 which was described above, two shift registers are employed, so that during a read, the selected 50% of the memory contents are exposed. In alternative versions larger memory segments, or larger granularity of selection than a bit, or using addressable stored data to respond to queries are suggested techniques. These variations offer trade-offs to the system designer concerned with cost versus security.

During this read operation a portion of the contents of the cartridge 20 is transferred to the coprocessor. The portions which are selected are determined by a "random" number generated by the coprocessor. Both the "random" number as well as the response from the cartridge 20 are then stored in the coprocessor. This information can then be compared with the token data (FIG. 3) which is also transferred to the coprocessor from the software distribution medium. Failure of the token data to correspond to the expected token data is taken as proof of forgery of the token cartridge and results in rejection by the coprocessor of the decryption key for future use, and of course only if the decryption key is accepted for future use can the protected software be executed.

FIG. 2 is a block diagram of one embodiment of cartridge 20. In this embodiment the token device is implemented as a single silicon CMOS integrated circuit chip 25 for cost and physical security reasons. This chip is appropriately packaged so that the data storage elements 120, 220 are continuously powered by a battery 26. CMOS integrated circuits can be built with static power requirements so small that the data stored in these registers, if not read out, can be expected to be preserved for a period almost equal to the shelf life of the battery. In the case that the data is read, as will be described, the other components needed to affect reading are supplied with power from an external source through the external power and ground lines 27. As shown in FIG. 2 the cartridge 20 is coupled to the coprocessor or the host PC via connector 23 having Clock, Selection, Data Input, Data Output, External Power and External Ground lines. The cartridge 20 contains two memory segments in the form of Serial In, Serial Out, Shift Left, Shift Registers 120, 220, a first segment including cells 121-12n and a second segment including cells 221-22n. Shift registers of this kind have the property that the state of the bit stored in their left-most cells (121, 221) is reflected in the state of their output lines (D1, D2). They have the additional properties that when the falling edge of a clock pulse is presented at their clock lines (C1, C2) the state of each cell is changed to that of the cell to its immediate right so that the pattern of bits in the register is shifted to the left. In the case of the right-most cells (12n, 22n) the falling edge of the clock pulse causes these cells to assume the state of the data input lines (D3, D4). The cells can be filled with data by supplying a data bit at each of the two data input lines and then supplying a clock pulse. If this procedure is repeated for n clock pulses, then all n bits of the registers will be filled. An encrypted (under AK) copy of these bits could then be made and stored on a floppy disk to supply the encrypted description of the token data. This procedure is followed by a software author or in this case the computer center to prepare the authorization to a coprocessor to accept an AK.

When a read operation is performed, each bit of the coprocessor generated random number is placed consecutively on the select line. Each setting of the select line 21 is followed by a clock pulse. Both shift registers will shift left on each clock pulse. Data from the first shift register is placed on the line D1 and from the second shift register on the line D2; both of which are inputs to a multiplexer 22 which is in turn controlled by the select line 21 from the coprocessor or host PC. The select line 21 determines which of the two signals D1 or D2 are coupled through the latch 24 to the output DATA. The latch is used to prevent a pirate from obtaining the token data by changing the select twice for each clock pulse. The consequence of this arrangement is that for each bit which is presented at the data out, two bits have been shifted out of the registers, and two bits, which are useless for authorization, have been shifted in.

Accordingly, and assuming that the entire memory contents of the cartridge 20 were read out, one observing the input to the select line 21 and DATA output, would only observe, at most, 50% of the contents of the cartridge 20. The coprocessor knows from the Encrypted token information exactly what bits should have appeared in that 50% so it has sufficient information to confirm the validity of that authorization, but a pirate lacking the destroyed 50% will not be able to forge an authorization.

When the coprocessor 15 is requested to acquire an AK, such as the AK which is needed to access the computer center mainframe, an ARE process is initiated. This begins when the encrypted software decryption key and encrypted token data are read into the RAM 151 or temporary memory 15T. In addition, a "random" number is generated by the coprocessor and used in performing a read operation on the cartridge 20 as previously described. The "random" number is used to select which bits of which memory segments will be effective to pass the multiplexer 22. The coprocessor 15 stores the "random" number in RAM 151 along with the resulting DATA from the cartridge 20.

It should be understood by those skilled in the art that there are a very large number of variations on the design of the token cartridge. All have the properties that the data read from the cartridge is transformed as a function of both the query bits and the token data content and that the resulting reply from the token is predictable if the complete content of the token is known.

The coprocessor decrypts the software decryption key ECSK(AK) and the resulting software decryption key (AK) is used to decrypt the token data to produce clear text token data. One of the properties of the coprocessor 15 is the presence of one or more CSKs, installed by the vendor of the coprocessor. In the case that there are multiple CSKs, the encrypted software key could be supplied with a reference to the correct CSK in a header. Such headers could provide an index to the correct CSK in plain text or a recognition flag which decrypts to an expected pattern only if the correct CSK is used. Many other methods are possible. Having decrypted EAK with the correct CSK, the coprocessor can then combine the stored "random" number or query with the clear text token data and independently determine the "correct" response. The actual response (the DATA received from the cartridge 20) can then be compared to the "correct" response. If the two quantities compare favorably that is taken as an indication that the cartridge 20 authorizes the coprocessor to store AK in nonvolatile RAM or permanent memory 15P for future use. The user can now successfully request that the coprocessor execute the software protected by the newly acquired AK such as that software needed to access the computer center mainframe. It should be noted that the key AK may be re-encrypted by the processor prior to storage. This step of re-encryption could provide improved protection of the stored key or could, if used correctly, support storage of the key outside the coprocessor.

On the other hand, if the "correct" and actual response of the cartridge do not compare favorably, the software decryption key (AK) is discarded and the coprocessor is unable to properly execute the encrypted software wherefore the application program will not run properly.

It should also be apparent that this transaction destroys the contents of the cartridge 20 so that it cannot be reused to authorize any other coprocessor to run the application, or other any application program.

The enormous number of possible selections of the contents of the different segments of the cartridge that can be made by the coprocessor and the amount of information in which the pirate must reconstruct by trial and error are the barriers to the pirate's successful reconstruction of the cartridge 20. The probability of successful forgery (P (Forgery)) is a function of the probability that the coprocessor will ask for the same selection at any given bit of the request (P (same)), the probability that the pirate will guess the "lost" data of an observed transaction correctly (P (guess)), and the number of bits requested by the coprocessor in the validation transactions (Numbits). P(forgery)=(P(same)+(1−P(same))(P(guess))) to the power Numbits. If P(same)=0.5 and P(guess)=0.5 and Numbits=128 as could easily be achieved in practice with a small integrated chip, then P(forgery) is approximately ten to the −16th power. If the rate of which a pirate would test his guesses (a rate set by the PCP) is once per second, then even such a small cartridge would force a search lasting, on an average, more than two hundred million years. The coprocessor is, thus, able to determine reliably whether or not the cartridge it is reading was supplied by the software vendor to validate ownership or is a forgery, without exposing the information needed to create a successful forgery. The coprocessor will only store a decryption key (AK) for later use after the cartridge has been verified.

In addition to the foregoing apparatus, FIG. 1 shows that the composite intelligent terminal includes, in addition to the I/O connections already mentioned, a connection to the modem 400. The modem 400 is conventionally used to provide an interface to the telephone system so the remote computing facility may be connected to the terminal or PC through the public telephone switching network.

It should be apparent to one skilled in the art that the modem represents only one of the very large number of ways to connect the intelligent terminal to the host computing complex. In particular, local area networks, direct coax cables, twisted pair wires, lightwave or radio broadcast are some of the other means to connect the terminal to the computing complex. Some host mainframe computers are able to accept such connection through means other than the communications controller and channel.

Although FIG. 1 shows that the intelligent terminal includes the host 10 as well as a coprocessor 15, that is not essential to the invention. In an alternative configuration, the coprocessor 15 is positioned in a data path between the terminal and the modem 400. In this configuration the terminal consists of little more than the user interface control 9, the display 11, the manual input 13 and the I/O ports 19. Such a composite intelligent terminal would not support loading AK into the coprocessor 15 and would therefore require that coprocessor 15 be temporarily attached to a sufficiently intelligent system to support that transaction. That necessary transaction could conveniently be provided as a service at the computing center to support users with "dumb" terminals.

Figure 4:
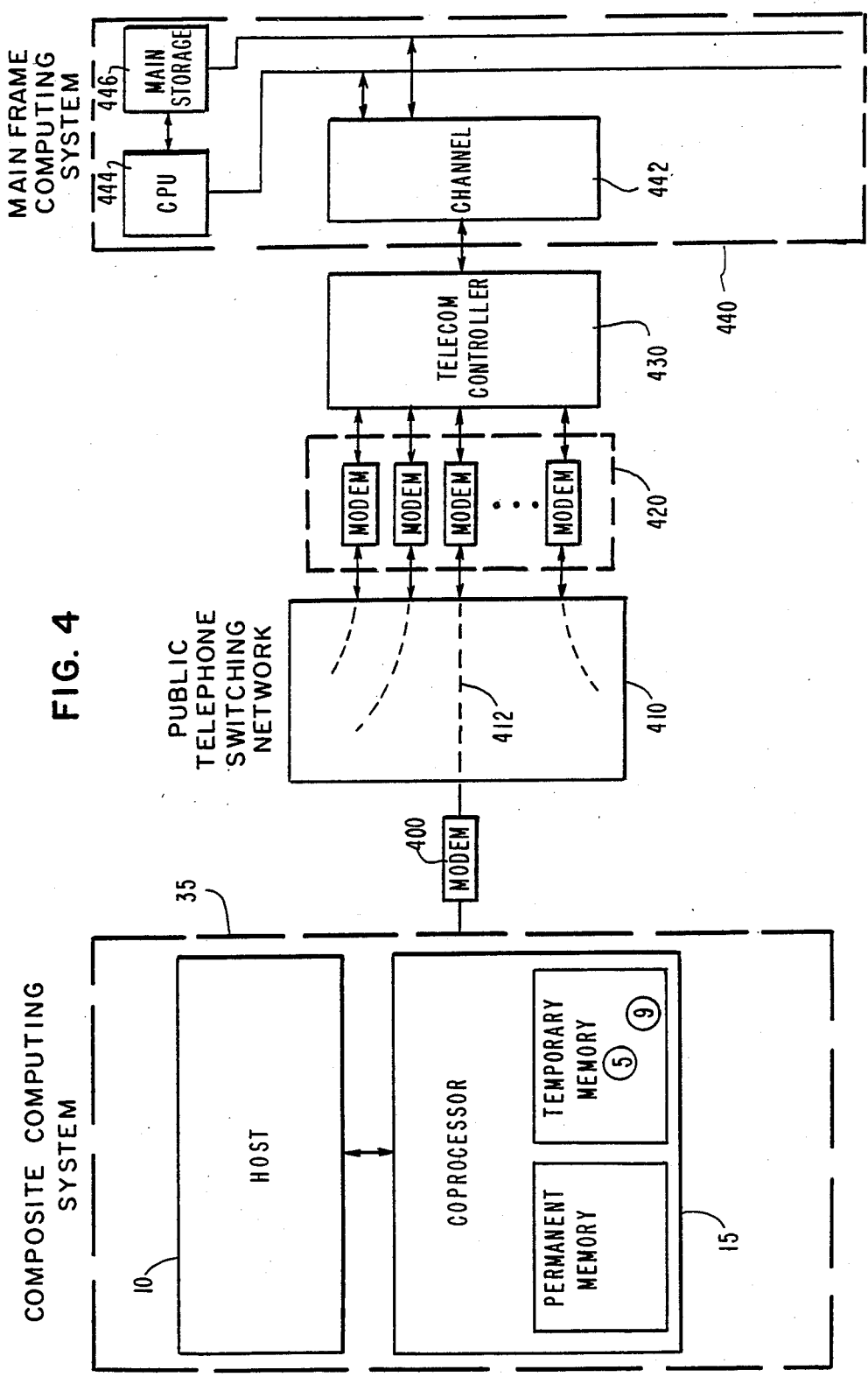
FIG. 4 shows the remote terminal of FIG. 1 coupled to a computer complex via the public switched network.

FIG. 4 shows, in schematic fashion, a system including the composite intelligent terminal 35 (of FIG. 1) connected through the modem 400 to the public telephone switching network 410, and through the network to a remote computing center. As shown in FIG. 4, the remote computing center includes a bank of modems 420 coupled to a mainframe computer (typical of the IBM System/370) via a telecommunications controller (typical of the IBM 3725) to a channel 442 of the mainframe 440. The channel in turn connects to the mainframe 440 CPU 444 and main storage 446 to the modem. As shown in FIG. 4, the path from the modem 400 attached composite intelligent terminal 35, to the modem bank 420 at the mainframe 440 at the remote computing center is designated 412.

In accordance with the invention, a specific procedure is carried out in order to authorize the composite intelligent terminal 35; that procedure is schematically illustrated in FIG. 5.

FIG. 5 shows the procedure by which a user 500 obtains authorization from a computing center (or the computing center staff 501) to access that center's mainframe computer 440 using a remote terminal 35. The procedure begins with step S1 during which the user 500 presents personal identification to the computing center staff 501. The user's identity is recorded at step S2 in association with the unique key to be used as the identifier of that user's coprocessor 15 in a file on the mainframe 440. The user is given a copy of protected software distribution set, in step S3, with either a special terminal emulator which supports communications with that center's mainframe 440 or with an identifier program which that center may access remotely on the user's composite terminal system 35. The user 500 installs, at step S4, that software on his system. The installation procedure has already been described, it is generally similar to that specifically described in application Ser. No. 927,629. In the course of the installation procedure, the composite intelligent terminal system 35 generates a verification message (step S5). The verification message is encrypted, for example with the key AK and includes a coprocessor unique identification, such as a serial number. In any conventional manner the user may then, in step S6, return that verification message to the computing center staff 501. The computing center staff 501 then makes the verification message available, in a step S7, to the mainframe computer 440. The mainframe computer then tests the validity of the verification message by decrypting it under the key which identifies the expected coprocessor (which is the key that was identified in step S2). If the message is valid, then the mainframe 440 is thereafter in a condition in which it can communicate with that user 500 specifically through the composite terminal system 35. While validity may rest solely on encryption under AK, it can also require comparison of the coprocessor specific identifier (serial number, for example) with that information previously stored at step S2.

Figure 6:
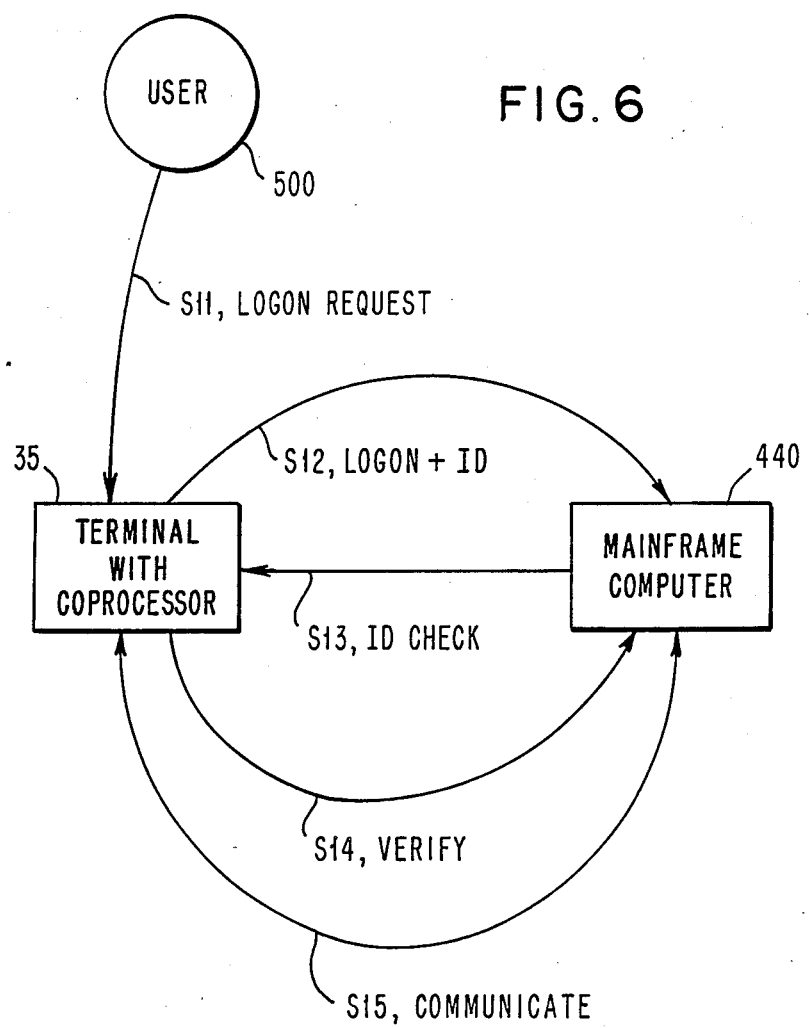
FIG. 6 shows a typical communication session between remote terminal and computer complex in accordance with the invention.

FIG. 6 shows a typical communication session between the mainframe 440 at the remote computing center 440 and the user 500, or more particularly his composite intelligent terminal system 35. The user transmits a log-on request, step S11, to his composite intelligent terminal system 35. In response the terminal system, employs the public telephone switching network connections (see FIG. 1 and FIG. 4) to send to the remote computing center (step S12) the user identification along with the log-on request. As previously indicated, this message may be in the clear or encrypted with a key common to some (or all) coprocessors. The remote computing center, or more particularly the mainframe computer 440, then generates and returns, in step S13, a message which is decipherable by the coprocessor 15 of the composite intelligent terminal system 35 which was identified in the log-on request transmitted in step S12, e.g. the message of S13 is encrypted under AK. The user ID transmitted in S12 allows the computing center to identify the appropriate key AK for the identified remote terminal. The software now residing at the composite intelligent terminal system prepares and sends a validating message, in step S14, which, when received at the mainframe 440, enables it to be assured that it is the expected coprocessor and the correct software package. As described above, the validating message of step S14 represents a transformation of a data stream (provided in S13) which has the following characteristics:

a. the result of the transformation is a unique function of the input data stream and the decryption key, b. by examining the results one can be sure that the decryption key was available to the processor performing the transformation, c. by examining the result and the input data stream the decryption key itself cannot be determined.

Thereafter, normal communications can proceed in plain text or ciphered text in either direction (step S15).

Periodically or randomly, with any period selected by the mainframe 440, steps S13 and S14 are repeated to ensure that the established session represented at step S15 is not redirected to an unauthorized user.

In the preceding description of a typical communications session, as shown in FIG. 6 it has been assumed that the computing center on the one hand and the remote terminal (via the coprocessor) on the other hand employ the same encryption key AK. However, other options are available. If, rather than installing a single decryption key (AK) as already described, the installation process actually installed, at the coprocessor, a key pair (AK1, AK2), then the computing center transmissions could be encrypted under AK1 and the remote terminal transmissions could be encrypted under AK2. By virtue of the installation process installing both AK1 and AK2 in the remote terminal, both keys are available for decryption of computing center messages and encryption of transmissions to the computer center. Equally, the computing center would have both keys (AK1 and AK2) available for decrypting messages from the remote terminal and encrypting messages to the remote terminal.

It should also be apparent that the operations carried out, at the remote terminal, by the coprocessor or PCP are transparent to the user, or his host or terminal. For example, neither the user nor his terminal or host has access to decryption keys and without those keys of course, cannot decrypt or encrypt messages from/to the computing center. Rather, encrypted messages received at the host or terminal must be passed on to the coprocessor for decryption. Likewise, to the extent that the host or terminal originates information for transmission to the computing center, that information must be passed on to the coprocessor for encryption. The user (or his host or terminal) may also be unaware of the fact that some information is transmitted in the clear; whether and when information transmitted to the remote terminal is encrypted by the computing center is of course under the computing center's control; likewise the computing center can determine, by controlling the PCP or coprocessor, when and to what extent information transmitted by the remote terminal is to be encrypted.

In an entirely similar fashion, since the communication link between the computing center and the coprocessor is unavailable to the host or terminal, at times solely determined by the computing center, the keys actually employed for encryption/decryption can be altered. For example, during the course of a communication session, the computing center may transmit to the PCP a command to change from a key AK (or a key pair AK1, AK2) to a different key BK (or to a different key pair BK1, BK2). Such operations are entirely transparent to the user, and his host or terminal. While the new key BK (or key pair BK1, BK2) may be resident in the coprocessor, it is also within the scope of the invention to transmit these keys to the coprocessor during a session begun under a different key (AK).

It is also within the scope of the invention for the computing center to use the initial encrypted exchange (steps S13, S14) to merely identify the coprocessor or PCP as an authorized terminal, and to thereafter generate a unique session key (or keys) for each different communication session with the authorized terminal. The ability of the participants of a session, each of which has access to a key or key pair (or larger set of keys), to use that information to generate a unique session key is well within ordinary skill and need not be described herein. Clearly, the authorized terminal and the computing center have this common information and thus can generate a unique session key or keys as and when needed.

A typical initial authorization process has already been described in connection with FIG. 5. As has already been mentioned, there are variants on this process which do not require the user 500 to interface in steps S1, S3, S4, S5 and S6. In this alternative, the remote terminal, or at least the coprocessor element of the remote terminal to be authorized, is co-located at the computing center and in direct communication with the mainframe 440. In this state, the information transferred during steps S1, S3, S4, S5 and S6 can be effected without the presence of the user 500. More particularly, using any conventional protocol, the coprocessor 15 can identify itself to the mainframe 440 (including for example a coprocessor specific number such as a serial number) and the mainframe 440 can directly transfer to the coprocessor 15 the key AK. This procedure clearly requires that the serial number be kept secret from the user. This procedure, thus, anticipates that some portion of cases using the method of remote terminal security described herein will involve coprocessors which are distributed by the computing center. As a result of this procedure, the mainframe 440 has stored information identifying the specific coprocessor, the decryption key that it is capable of using and all the steps implied in connection with FIG. 5 are carried out before the coprocessor or PCP is provided to the user 500. Thereafter, the user takes possession of the coprocessor or PCP and carries it to the remote terminal. He can immediately thereafter effect the communication session such as that represented in FIG. 6.

As an alternative, the information represented by steps S1, S3 and S4 can be carried out while the coprocessor is physically co-located with the mainframe 440 at the computing center. Thereafter, the coprocessor or PCP is presented to the user 500 who carries it to his host or remote terminal. At that point, the remaining steps represented in Fig. 5 (S5, S6) are carried out with the coprocessor remotely located from the computing center.

It should be apparent from the foregoing that the invention meets the objects previously set forth. It should also be apparent to those skilled in the art that many and various changes can be made, all within the spirit and scope of the invention. For example, installation of the decryption key (AK) in the PCP via a disk and token pair has been described in detail. However, as is described in Ser. No. 927,629 and Ser. No. 927,299 (the disclosure of these applications are incorporated herein by this reference), there are a wide variety of techniques which can be employed to safely transfer a decryption key (AK) into the PCP, other than using the token/disk pair. Many of these other techniques rely on a direct communication link between pairs of PCPs which prior to the transfer of secure information require that the parties to this communication satisfy themselves that the other party of the communication is a "member of the family". Accordingly, the invention is not to be limited to the specific examples described herein but is to be construed in accordance with the attached claims.

Having thus described our invention, what we claim as new, and desire to secure by Letters Patent is:

1. A method of remote terminal access comprising the steps of:
   (a) transferring an encrypted decryption key from a central computer to a physically secure coprocessor,
   (b) coupling said physically secure coprocessor to said remote terminal,
   (c) transferring an encrypted file from said coprocessor to said central computer to enable the central computer to identify the coprocessor which generated the encrypted file, and
   (d) examining said encrypted file at said central computer to verify that a specific coprocessor has created said encrypted file before authorizing access to said central computer by said remote terminal.

2. A method as recited in claim 1 in which said step (a) includes obtaining said encrypted decryption key from a magnetic disk by said physically secure coprocessor and in which said obtaining step includes performing a query/response protocol between said coprocessor and a token before accepting said decryption key.

3. A method as recited in claim 1 or 2 in which said step (c) includes writing said encrypted file onto a magnetic disk.

4. A method as recited in claim 1 or 2 which includes the further step of encrypting and decrypting at least some messages between said central computer and said remote terminal with a key identical or related to said encrypted decryption key.

5. A method as recited in claim 4 in which at least some messages exchanged between said remote terminal and said central computer include a replacement key for said coprocessor to be substituted for said encrypted decryption key or an earlier replacement key.

6. A method as recited in claim 1 in which said step (a) is implemented at a time when said physically secure coprocessor and said central computer are located adjacent each other.

7. A method as recited in claim 1 in which said step (a) includes:
   (a1) preparing a secure, read once hardware cartridge and storing therein token data,
   (a2) coupling to said coprocessor a file of encrypted token data, encrypted under said decryption key,
   (a3) decrypting said encrypted decryption key using a hardware key secured within said coprocessor,
   (a4) decrypting said file of token data to produce computed token data,
   (a5) generating a random number query and coupling said random number query to read said hardware cartridge to generate an actual cartridge response and thereby destroying the token data previously stored therein,
   (a6) computing a cartridge response in said coprocessor with said random number and said computed token data,
   (a7) comparing said actual cartridge response with said computed cartridge response, and
   (a8) discarding said decryption key unless said actual and computed cartridge responses compare favorably.

8. A method as recited in claim 7 in which said file of encrypted token data is stored on a magnetic disk along with application software at least a portion of which is encrypted under said decryption key and which includes a further step of decrypting said encrypted software under said decryption key.

9. A method as recited in claim 1 in which said step (c) includes:
- (c1) generating a coprocessor unique number, and
- (c2) encrypting said number under said decryption key.

10. A method as recited in claim 9 which includes the further steps of:
- (c3) writing said encrypted number onto a magnetic medium, and
- (c4) transporting said magnetic medium to said central computer.

11. A method as recited in claim 10 which includes the further steps of:
- (c5) reading said encrypted number by said central computer,
- (c6) decrypting said encrypted number under a copy of a decryption key stored in said central computer, and
- (c7) comparing a result produced by said step (c6) with data stored by said central computer identifying an authorized coprocessor.

12. A method as recited in claim 11 which includes the further steps of:
- (c8) storing an authorization status for said coprocessor if said step (c7) produces a first result, or
- (c9) not storing an authorization status for said coprocessor if said step (c7) does not produce said first result.

13. A method a recited in claim 12 which includes a further step of allowing subsequent communication with any terminal having access to any coprocessor which has said authorization status and refusing communication with any terminal not having access to a coprocessor with such an authorization status.

14. A method as recited in claim 9 which includes the further steps of:
- (c3) writing said encrypted number to a hardware cartridge, and
- (c4) transporting said hardware cartridge to said central computer.

* * * * *

UNITED STATES PATENT AND TRADEMARK OFFICE
CERTIFICATE OF CORRECTION

PATENT NO. : 4,916,738

DATED : April 10, 1990

INVENTOR(S) : Chandra et al

It is certified that error appears in the above-identified patent and that said Letters Patent is hereby corrected as shown below:

Col. 1, line 13, "927,629" should be --927,309--;

line 16, after "1986" insert --;--.

Col. 7, line 30, "it" should be --its--.

Col. 9, line 6, "controls" should be --control--.

Col. 11, line 35, insert --a-- before "unit".

Col. 13, line 27, "other" should be --another--.

Col. 15, line 47, "other any" should be --any other--.

Signed and Sealed this

Twentieth Day of August, 1991

Attest:

HARRY F. MANBECK, JR.

*Attesting Officer*     *Commissioner of Patents and Trademarks*